Nov. 19, 1957  R. M. HAUCK  2,813,647
HAND TRUCK
Filed July 29, 1955  3 Sheets-Sheet 1
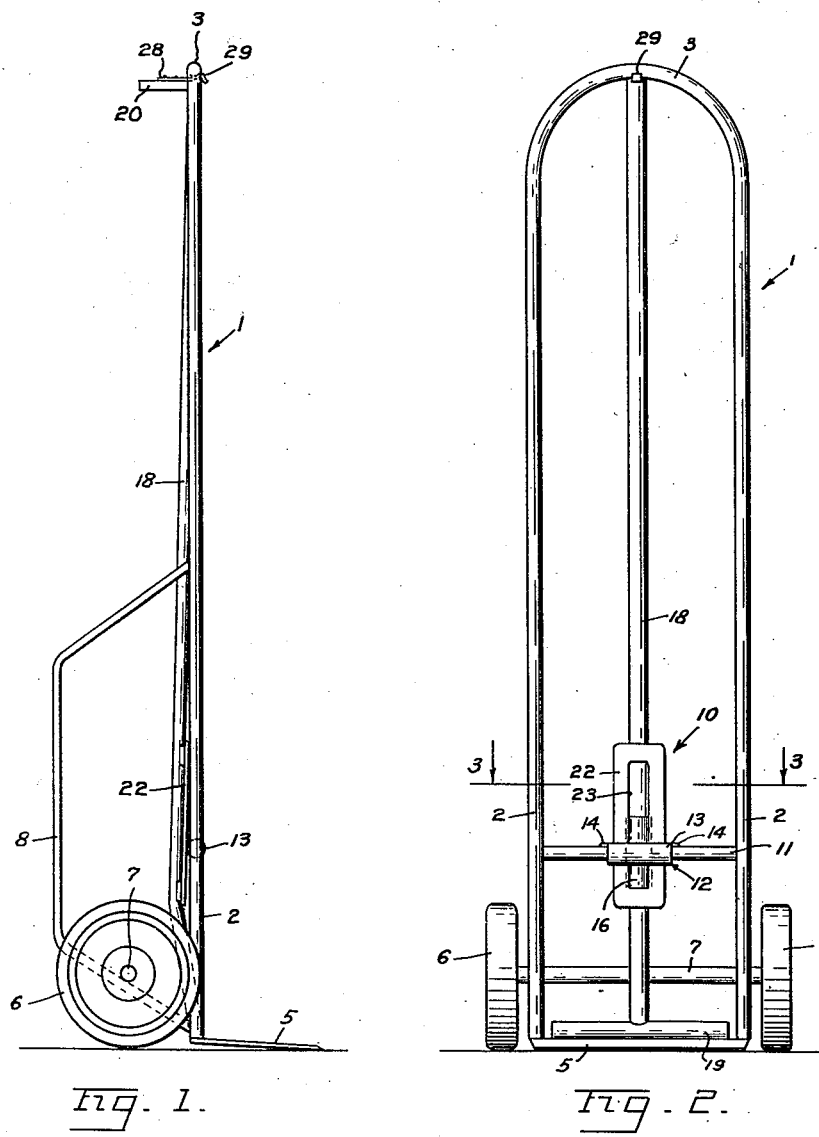
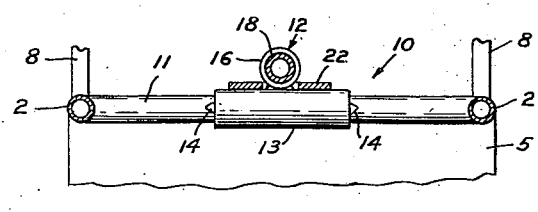
INVENTOR.
RICHARD M. HAUCK
BY White & Reaboff
ATTORNEYS INVENTOR.
RICHARD M. HAUCK
BY White & Riaboff
ATTORNEYS Nov. 19, 1957     R. M. HAUCK     2,813,647
HAND TRUCK Filed July 29, 1955     3 Sheets-Sheet 3

INVENTOR.
RICHARD M HAUCK
BY White & Reaboff
ATTORNEYS

United States Patent Office

2,813,647
Patented Nov. 19, 1957

2,813,647

HAND TRUCK

Richard M. Hauck, Berkeley, Calif., assignor, by mesne assignments, to Charles Thomas and Frank Domonic Nicoli, El Cerrito, Calif.

Application July 29, 1955, Serial No. 525,277

7 Claims. (Cl. 214—511)

This invention relates to a hand truck.

The purpose of this invention is to provide a hand truck with a simple and efficient mechanism for pushing the cargo standing on the platform of a truck off said platform. Another purpose of this invention is to provide a hand truck of the type described in which the mechanism for pushing the cargo off the platform is so constructed as to provide the greatest leverage at the beginning of the pushing operation which leverage gradually decreases as the pushing operation progresses.

Another object of this invention is to provide a hand truck of the type described, in which a bar pushing the cargo off the platform, slides on the platform during the pushing operation.

Other objects and advantages will appear as the specification proceeds and the novel features of the device will be particularly pointed out in the claims hereto annexed.

In this specification and the annexed drawing, the invention is illustrated in the form considered to be the best but it is understood, that the invention is not limited to such form; and it is also to be understood that in and by the claims following the description, it is desired to cover the invention in whatsoever form it may be embodied.

My invention is illustrated in the accompanying drawings forming a part of this specification in which:

Fig. 1 is a side view of the hand truck.

Fig. 2 is a front view of said hand truck.

Fig. 3 is a section along the line 3—3 of Fig. 2.

Figure 4:
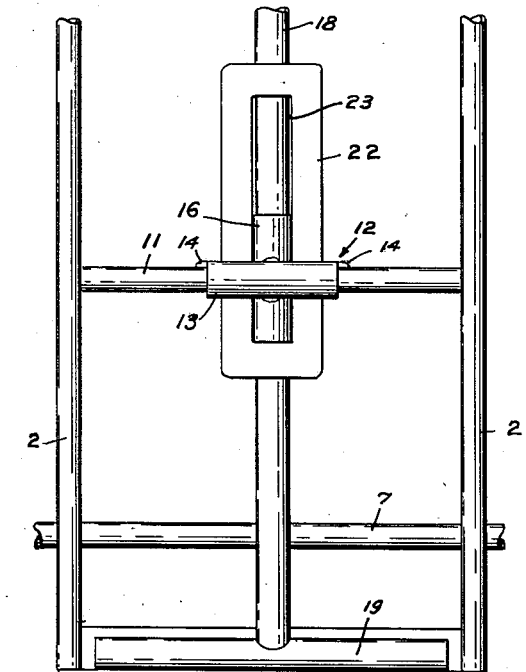
Fig. 4 is an enlarged front view of the lower part of said hand truck.
Figure 5:
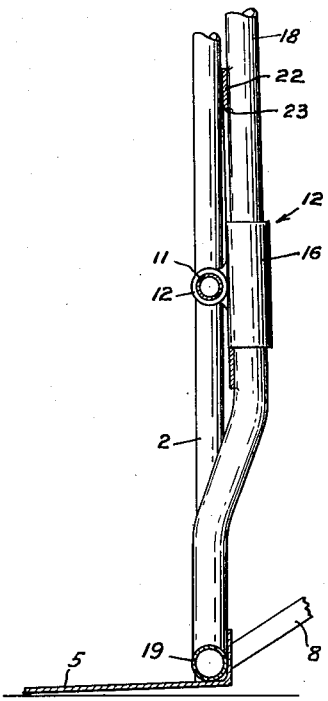
Fig. 5 is a section along the line 5—5 of Fig. 4.
Figure 6:
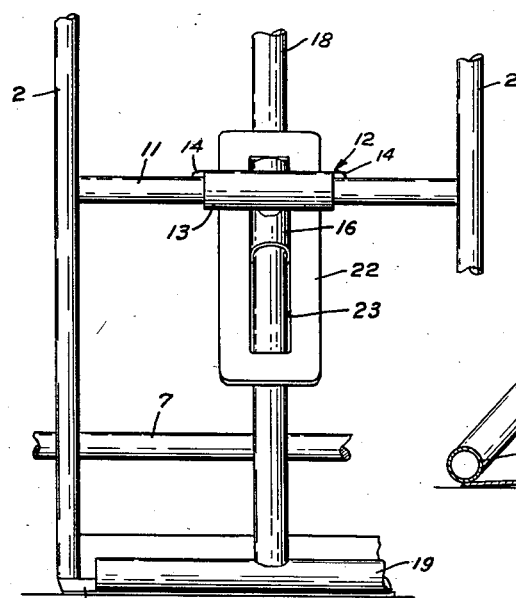
Fig. 6 is a front view of the lower part of said hand truck, showing the parts in an extreme pushing position.
Figure 7:
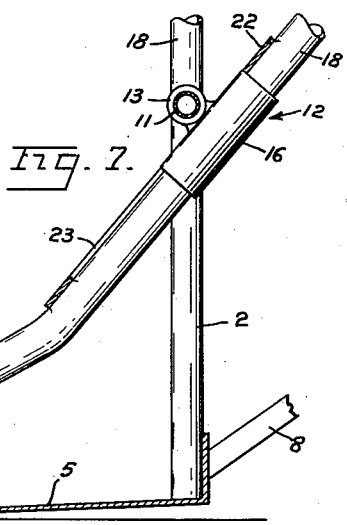
Fig. 7 is a section along the line 7—7 of Fig. 6.

In detail, the hand truck comprising the subject matter of this invention, consists of a frame 1 having two standards 2 connected by a continuous half circular portion 3. The frame 1 is preferably made of a metal tubing. A flat platform 5 is secured to the lower ends of the standards 2. The platform 5 supports a cargo, such as a stack of crates, boxes or the like.

The hand truck is moved on a pair of wheels 6 rotatably affixed on an axle 7 secured to a pair of brackets 8. The latter are welded or otherwise secured to the frame. The parts so far described are standard.

The hand truck is provided with a cargo unloading mechanism generally indicated at 10. The latter includes a shaft 11 secured to the standards 2 above and parallel to the axle 7. The shaft 11 carries a cross-bearing 12 consisting of a bearing 13 journalled on the shaft 11, which bearing is centrally located on said shaft and held in its position by an embossment 14 welded on said shaft on each side of said bearing. A sleeve 16 is welded or otherwise secured tangentially to said bearing 13 at their middles at the right angle to each other to form a cross. The sleeve 16 slidably carries a lever 18 extending from the top of the frame 1 to the platform 5 and terminating at its lower end with a pusher 19. A handle 20 is provided at the upper end for convenience of operation of said lever. The cross-bearing 12 permits the lever 18 to be rocked about the shaft 11 and at the same time to be slid downwardly so that the pusher 19 is moved away from the frame 1, where it normally rests, along said platform 5, being in sliding contact with the latter, thus pushing the cargo off said platform. It shall be noted that the pusher 19 exerts its pressure on the cargo substantially at one and the same place during all the operation of pushing the cargo off the platform, and that the place where said pusher contacts said cargo is very close to said platform.

The lever 18 carries means which prevents rotation of said lever along its longitudinal axis and limits the upward and downward motion of said lever in said sleeve 16. Said means comprises a controlling plate 22 welded at its top and bottom to said lever 18. The plate 22 is rectangular in shape and has an elongated rectangular opening 23 therein. Said plate is welded to the lever 18 on the side facing the shaft 11 and is in constant sliding contact with the bearing 13, thus preventing said lever from rotating in the sleeve 16. When the lever 18 is moved downwardly, the plate 22 moves therewith, having the sleeve 16 within said opening 23, until the top edge of said opening strikes the top of said sleeve, whereupon the downward movement of the lever 18 is stopped. The upward movement of the lever 18 is also limited by the lower edge of opening 23 striking against the lower end of said sleeve 16.

The lever 18 is provided with a locking mechanism in form of a spring 28 secured to the top of the said lever and having a raised portion 29, which spring locks said lever to the frame 1, but permits quick disengagement therefrom by pulling the lever 18.

Figure 8:
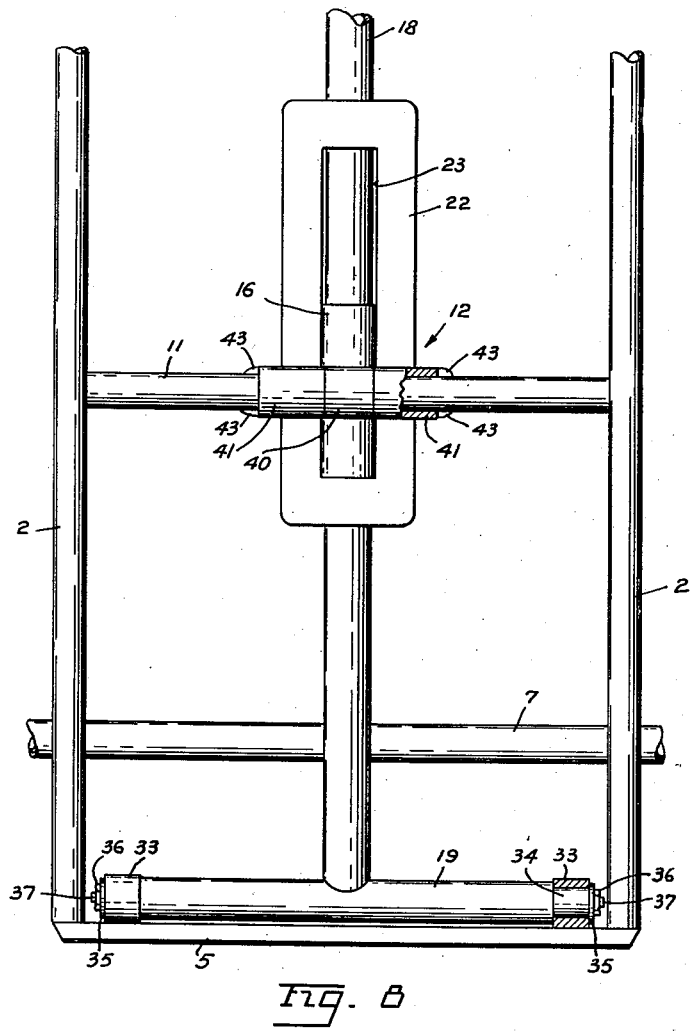
Fig. 8 shows a modified form of said hand truck.

Fig. 8 shows a modified form of said hand truck in which the pusher 19 is provided with pusher rollers 33 to reduce friction between said pusher and the platform 5. The rollers 33 are carried by said pusher 19 on its ends 34 of reduced diameter and are held in place by washers 35 and nuts 36 screwed on threaded ends 37 of said pusher protruding beyond said rollers.

In order to reduce friction between the plate 22 and the bearing 13, said bearing is reduced in length substantially to the width of the opening 23 in said plate, as shown at 40 in Fig. 8. On each side of said bearing 40 is provided a plate roller 41 slightly longer than the width of the side of the plate 22. The rollers 41 are held in place by embossments on the shaft 11.

The operation of the device is as follows:

In order to unload a cargo, such as a stack of boxes, from the platform 5, the operator pulls the lever 18 to the left looking at Fig. 1 and slightly downwardly. The lever 18 disengages from the frame 1 and begins to rotate about the shaft 11 and to slide in the sleeve 16 so as to keep the pusher 19 sliding on the platform 5. At the beginning of the pushing operation a considerable force is needed to overcome the inertia of the load and the friction between said load and the platform. The mechanism, therefore, provides the greatest leverage at the beginning of the pushing operation. Thereafter the leverage diminishes gradually and is the least when the load leaves the platform 5. At this moment the further movement of the lever 18 is stopped by the controlling plate 22. The operator pulls the lever 18 upwardly and pushes it forward at the same time until the upward motion of the lever is stopped by said controlling plate. The operator swings the lever 18 into its initial position, as shown in Fig. 1, and the spring 28 locks said lever in place.

I claim:

1. The combination of a hand truck having a frame including a pair of standards, a pair of wheels rotatably secured to said frame, a platform for carrying a cargo attached to said frame, with a mechanism for pushing the cargo off said platform comprising a lever, a pusher secured to the lower end of said lever for pushing the cargo, a shaft secured between said standards, a cross-bearing rotatably carried by said shaft and including a sleeve, said lever being slidably arranged in said sleeve for upward and downward motion, means on said lever for preventing in cooperation with said cross-bearing rotation of said lever and for limiting the upward and downward motion of said lever in relation to said sleeve, and means for releasably locking said lever to said frame.

2. The combination of a hand truck having a frame including a pair of standards, a pair of wheels rotatably secured to said frame, a platform for carrying a cargo attached to said frame, with a mechanism for pushing the cargo off said platform comprising a lever, a pusher secured to the lower end of said lever for pushing the cargo, a shaft secured between said standards, a cross-bearing rotatably carried by said shaft and including a sleeve, said sleeve carrying said lever with freedom of sliding longitudinally, a controlling plate secured to said lever for preventing in cooperation with the cross-bearing rotation of said lever about its longitudinal axis and for limiting the upward and downward motion of said lever in relation to said sleeve, and means for releasably locking said lever to said frame.

3. The combination of a hand truck having a frame including a pair of standards, a pair of wheels rotatably secured to said frame, a platform for carrying a cargo attached to said frame, with a mechanism for pushing the cargo off said platform comprising a lever, a pusher secured to the lower end of said lever for pushing the cargo, a shaft secured between said standards, a cross-bearing rotatably carried by said shaft and including a sleeve, said sleeve slidably carrying said lever, a controlling plate secured to said lever for sliding engagement with said shaft, said plate having an opening therein for limiting in cooperation with said sleeve the upward and downward motion of said lever and means for releasably locking said lever to said frame.

4. The combination of a hand truck having a frame including a pair of standards, a pair of wheels rotatably secured to said frame, a platform for carrying a cargo attached to said frame, with a mechanism for pushing the cargo off said platform comprising a lever, a pusher secured to the lower end of said lever for pushing the cargo, a shaft secured between said standards, means journalled on said shaft and rotatably and slidably supporting said lever for moving said pusher away from the frame along and in sliding contact with said platform for pushing the cargo off said platform, means for preventing rotation of said lever about its longitudinal axis and for limiting sliding motion in said first mentioned means, and means for releasably locking said lever to said frame.

5. The combination of a hand truck having a frame including a pair of standards, a pair of wheels rotatably secured to said frame, a platform for carrying a cargo attached to said frame, with a mechanism for pushing the cargo off said platform comprising a lever, a pusher secured to the lower end of said lever for pushing the cargo, a shaft secured between said standards, a cross-bearing journalled on the shaft, said lever being slidable in said cross-bearing and swingable about said shaft to produce a linear motion of the pusher in sliding contact with the platform for pushing the cargo off said platform, means for preventing rotation of the lever about its longitudinal axis and for limiting the sliding motion of the lever in said cross-bearing, and means for releasably locking said lever to said frame.

6. The combination of a hand truck having a frame including a pair of standards, a pair of wheels rotatably secured to said frame, a platform for carrying a cargo attached to said frame, with a mechanism for pushing the cargo off said platform comprising a lever, a pusher secured to the lower end of said lever for pushing the cargo, a shaft secured between said standards, a cross-bearing journalled on said shaft, said cross-bearing including a sleeve, said lever being slidable in said sleeve and swingable with said cross-bearing about said shaft to produce a forward motion of said pusher along and in sliding contact with said platform for pushing the cargo off said platform, means for preventing rotation of the lever about its longitudinal axis and for limiting the sliding motion of the lever in said cross-bearing, and means for releasably locking said lever to said frame.

7. The combination of a hand truck having a frame including a pair of standards, a pair of wheels rotatably secured to said frame, a platform for carrying a cargo attached to said frame, with a mechanism for pushing the cargo off said platform comprising a lever, a pusher secured to the lower end of said lever for pushing the cargo, a pair of rollers secured to the ends of said pusher for contacting the platform, a shaft secured between said standards, a cross-bearing journalled on said shaft, said cross-bearing including a sleeve, said lever being slidable in said sleeve and swingable with said cross-bearing about said shaft to produce a forward motion of said pusher along and in sliding contact with said platform for pushing the cargo off said platform, means for preventing rotation of the lever about its longitudinal axis and for limiting the sliding motion of the lever in said cross-bearing, said means including a pair of rollers rotatable on said shaft on each side of the cross-bearings, a plate secured to said lever and being in contact with said second mentioned rollers, and means for releasably locking said lever to said frame.

References Cited in the file of this patent
UNITED STATES PATENTS

| | | |
|---|---|---|
| 1,542,023 | Alexander | June 16, 1925 |
| 2,240,355 | Swimley | Apr. 29, 1941 |
| 2,649,219 | Nielsen | Aug. 18, 1953 |
| 2,682,348 | Stumphauser | June 29, 1954 |